US007817698B2

(12) United States Patent
Li et al.

(10) Patent No.: US 7,817,698 B2
(45) Date of Patent: Oct. 19, 2010

(54) MECHANICALLY TUNABLE ELASTOMERIC OPTOFLUIDIC DISTRIBUTED FEEDBACK DYE LASERS

(75) Inventors: Zhenyu Li, Pasadena, CA (US); Demetri Psaltis, Pasadena, CA (US); Axel Scherer, Laguna Beach, CA (US); Zhaoyu Zhang, Pasadena, CA (US)

(73) Assignee: California Institute of Technology, Pasadena, CA (US)

( * ) Notice: Subject to any disclaimer, the term of this patent is extended or adjusted under 35 U.S.C. 154(b) by 0 days.

(21) Appl. No.: 11/836,578

(22) Filed: Aug. 9, 2007

(65) Prior Publication Data

US 2008/0159351 A1    Jul. 3, 2008

Related U.S. Application Data

(60) Provisional application No. 60/837,177, filed on Aug. 11, 2006.

(51) Int. Cl.
*H01S 3/20*    (2006.01)

(52) U.S. Cl. .............................. 372/53; 372/20; 372/54; 372/51

(58) Field of Classification Search .................. 372/53, 372/20, 54, 51
See application file for complete search history.

(56) References Cited

U.S. PATENT DOCUMENTS 7,040,338 B2 *   5/2006   Unger et al. ............. 137/15.19

7,351,601 B2 *   4/2008   Scherer ....................... 438/31
2003/0021301 A1  1/2003   Vahala et al.
2003/0186255 A1 * 10/2003  Williams et al. .............. 435/6
2003/0235924 A1 * 12/2003  Adams et al. .............. 436/172

FOREIGN PATENT DOCUMENTS

WO    WO 2006/086551    8/2006

OTHER PUBLICATIONS

Monolithic Microfabricated Valves and Pumps by Multilayer Soft Lithography; Science vol. 288, No. 5463, pp. 113-116; Apr. 2000.
Helbo et al., A micro-cavity fluidic dye laser; J. Micromech. Microeng., vol. 13, pp. 307-311; 2003.

(Continued)

*Primary Examiner*—Minsun Harvey
*Assistant Examiner*—Kinam Park
(74) *Attorney, Agent, or Firm*—Milstein Zhang & Wu LLC; Joseph B. Milstein

(57) ABSTRACT

The invention relates to a microfluidic dye laser including a pump light source configured to provide light having a pump light wavelength. The microfluidic dye laser also includes an elastomer substantially optically transparent at the pump light wavelength and at a microfluidic dye laser wavelength. A microfluidic channel configured to accept a fluidic dye is defined in the elastomer. An optical grating is formed in a single mode 3D waveguide in the microfluidic channel in order to provide a single mode microfluidic dye laser light as output in response to illumination with light from the pump light source. In another aspect, the invention features a method of tuning a wavelength of a microfluidic dye laser light by mechanically deforming the elastomeric laser chip to change the grating period in the optical cavity.

30 Claims, 9 Drawing Sheets

OTHER PUBLICATIONS

Bilenberg et al., Tunable microfluidic Dye Laser; Proceedings of the 12th Int. Conf. on Solid-State Sensors, Actuators and Microsystems, Transducers, 206-209; 2003.

Yariv, Optical Electronics in Modern Communication (Oxford, New York); 1997.

Unger et al., Monolithic microfabricated valves and pumps by multilayer soft lithography; Science, vol. 288, pp. 113-116; 2000.

Weller Brophy et al., Analysis of wave-guide gratings—application of Rouard's method, J. Opt. Soc. Am. A, vol. 2, pp. 863-871; 1985.

Shank et al., Tunable distributed-feedback dye laser; App. Phys. Lett., vol. 18, pp. 395-396; 1971.

McDonald et al., Poly(dimethylsiloxane) as a material for fabricating microfluidic devices; Acc. Chem. Res., vol. 35, pp. 491-499; 2002.

Silfvast, Laser Fundamentals (Cambridge, Cambridge); 2004.

Oki et al., Multiwavelength distributed-feedback dye laser array and its application to spectroscopy; Opt. Lett., vol. 27, pp. 1220-1222; 2002.

Coldren et al., Diode lasers and photonic integrated circuits; Wiley-Interscience, New York; pp. 66-67, 102-105, and 322-323; 1995.

Quake et al., From micro- to nanofabrication with soft materials; Science, vol. 290, pp. 1536-1540; 2000.

Xia et al., Soft lithography, Arum. Rev. Mater. Sci., vol. 28, pp. 153-184; 1998.

DeRosa et al., 11-color, 13-parameter flow cytometry: identification of human naive T cells by phenotype, function, and T-cell receptor diversity; Nat. Med., vol. 7, pp. 245-248; 2001.

Streifer et al., Coupling coefficients for distributed feedback single- and double-heterostructure diode lasers; IEEE J. Quantum Electron, vol. 11, pp. 867-873; 1975.

Balslev et al., Microfluidic Single-Mode Laser Using High-Order Bragg Grating and Antiguiding Segments; Optics Express, Optical Society of America ("OSA"), Jan. 10, 2005, pp. 344-351, vol. 13, No. 1; (http://www.opticsexpress.org/abstract.cfm?URI=OPEX-13-1-344).

Vezenov et al., A Low-threshold, High-efficiency Microfluidic Waveguide Laser; JACS; Jun. 3, 2005, pp. 8952-8953, vol. 127.

Galas et al., Microfluidic turnable dye laser with integrated mixer and ring resonator; Applied Physics Letters; Jun. 22, 2005; France.

Psaltis et al., Developing optofluidic technology through the fusion of microfluidics and optics; Nature; Jul. 27, 2006, pp. 381-386, vol. 442.

Li et al., Single mode optofluidic distributed feedback dye laser; Optics Express, Optical Society of America ("OSA"), Jan. 23, 2006, pp. 696-701, vol. 14, No. 2; US.

Li et al., Mechanically tunable optofluidic distributed feedback dye laser; Optics Express, Optical Society of America ("OSA"), Oct. 30, 2006, pp. 10494-10499, vol. 14, No. 22, US.

Vezenov et al., Integrated Fluorescent Light Source for Optofluidic Applications, Applied Phyics Letters—AIP, Jan. 24, 2005, pp. 86-88, vol. 86, No. 4.

Cheng et al., Microfluidic Laser Embedded in Glass by Three-Dimensional Femtosecond Laser Microprocessing, Optics Letters-OSA, Sep. 1, 2004, pp. 2007-2009, vol. 29, No. 17.

\* cited by examiner

MECHANICALLY TUNABLE ELASTOMERIC OPTOFLUIDIC DISTRIBUTED FEEDBACK DYE LASERS

CROSS-REFERENCE TO RELATED APPLICATIONS

This application claims priority to and the benefit of U.S. provisional patent application Ser. No. 60/837,177, filed Aug. 11, 2006, which application is incorporated herein by reference in its entirety.

STATEMENT REGARDING FEDERALLY FUNDED RESEARCH OR DEVELOPMENT

The invention described herein was made in the performance of work under a DARPA contract HR0011-04-1-0032, and is subject to the provisions of Public Law 96-517 (35 U.S.C. §202) in which the Contractor has elected to retain title.

FIELD OF THE INVENTION

The invention relates to optofluidic lasers in general and particularly to a microfluidic laser that employs wavelength tuning and transverse and longitudinal mode selection.

BACKGROUND OF THE INVENTION

There is a growing interest in small optofluidic (microfluidic) dye lasers. Microfluidic dye lasers can provide laser light for an optical system on a chip ("SOC") or otherwise function as a compact laser light source. Generally the working fluid is a fluidic dye specifically designed for laser applications. Microfluidic lasers are typically powered by a conventional laser, such as a frequency doubled Nd:YAG pulsed laser or a high power laser diode. The wavelength of the pump light is generally selected such that a given dye can effectively absorb energy from the pump light source. Once excited by a suitable pump light source, the microfluidic dye laser provides laser light at a specific wavelength determined by the laser cavity and the type and concentration of the dye used.

On-chip liquid dye lasers represent promising coherent light sources for 'lab-on-a-chip' systems in that they allow the integration of laser sources with other microfluidic and optical devices. On-chip liquid dye lasers are examples of the new class of emerging optofluidic devices, in which the integration of microfluidics with the adaptive nature of liquids enables unique performance that is generally not obtainable within solid state materials. Tunable output wavelengths have been obtained using methods such as varying the dye concentration or by index of refraction tuning methods. Several groups have so far demonstrated such dye lasers by using different materials and laser cavity designs. Research groups at the Department of Micro and Nanotechnology at the Technical University of Denmark, the Department of Chemistry at Harvard and MIT, and the Laboratory of Photonics and Nanostructures in France, have previously reported operable microfluidic lasers using three different approaches.

In "*Microfluidic Single-Mode Laser Casing High-Order Bragg Grating And Antiguiding Segments*", Optics Express, Optical Society of America ("OSA"), Jan. 10, 2005, S. Balslev and A. Kristensen (Denmark) described single-mode lasing using a long-period, high-order asymmetric grating. Lasing in all but the fundamental transverse mode in the resonator waveguide was eliminated by inflicting losses on higher modes with the use of antiguiding segments. The microfluidic channel created between glass substrates was 15 mm long and 2 mm wide at the fluid input for the dye, narrowing down to 1 mm at the laser region. The size of the Balslev and Kristensen microfluidic laser was reported to be 10 mm by 20 mm and 1 mm high.

"*A Low-threshold, High-efficiency Microfluidic Waveguide Laser*", Journal of the American Chemical Society ("JACS") Communications, Jun. 3, 2005, also PCT patent application, WO 2006/086551, by Vezenov, et. al. (Harvard/MIT), described the use of a liquid-liquid ($L^2$) waveguide as the basis of a dye laser suitable for integration with microfluidic systems. The Vezenov microfluidic laser was fabricated using soft lithography. A 5-20 mm long active region was terminated at both ends with T-junctions, which were coated with thin layers of gold to act as mirrors for the optical cavity. The height and width of a center channel were reported to be 100 μm×400 μm.

"*Microfluidic tunable dye laser with integrated mixer and ring resonator*", Applied Physics Letters, Jun. 22, 2005, Galas, et. al. (France) described a dye laser on a chip using a planar optics for both a polymer resonator and an output waveguide. The Galas laser was based on a ring resonator connected to a waveguide. Laser wavelength was controlled by dye concentration. The device was reported to be 5 mm×5 mm in physical size.

A number of problems in the above microfluidic lasers have been observed. For example, because of the lack of both transverse mode and longitudinal mode selection, there can be undesired simultaneous multiple modes of operation and wide emission line widths. Another problem is that microfluidic laser wavelength tuning has been limited to dye selection and dye concentration, which require relatively complex fluidics apparatus, including valves for porting various types of dye solutions and for varying the dye concentration and index of refraction methods related to the selection of fabrication materials.

There is a need for a microfluidic laser optical structure that can provide both transverse mode and longitudinal mode selection. There is also a need for a tuning method and apparatus to vary the wavelength of a microfluidic laser independently of the type, concentration of the fluidic dye, and fabrication materials.

SUMMARY OF THE INVENTION

In one aspect, the invention relates to a microfluidic dye laser including a pump light source configured to provide light having a pump light wavelength. The microfluidic dye laser also includes an elastomer, the elastomer substantially optically transparent at the pump light wavelength and at a microfluidic dye laser wavelength. The microfluidic dye laser also includes a microfluidic channel defined in the elastomer. The microfluidic channel is configured as a single mode 3D waveguide. The microfluidic channel is also configured to accept a fluidic dye, and an optical grating formed in the single mode 3D waveguide to form a single mode optical cavity. When a fluidic dye is present in the single mode 3D waveguide, the single mode is configured to provide a single mode microfluidic dye laser light as output at the microfluidic dye laser light wavelength in response to illumination with light from the pump light source at the pump light wavelength.

In one embodiment, the elastomer is configured to change a resonant wavelength associated with an order of the optical grating in response to a mechanical deformation of the elastomer in a longitudinal direction of the single mode 3D waveguide.

In another embodiment, the mechanical deformation of the elastomer is configured to shift the microfluidic dye laser light wavelength.

In yet another embodiment, the microfluidic dye laser light wavelength shift is in a range of about 0 to 70 nm.

In yet another embodiment, the elastomer is configured to change a resonant wavelength associated with an order of the optical grating in response to a mechanical deformation of the elastomer in a transverse direction of the single mode 3D waveguide.

In yet another embodiment, the mechanical deformation of the elastomer is configured to shift the microfluidic dye laser light wavelength in response to a mechanical deformation of the elastomer in a transverse direction of the single mode 3D waveguide.

In yet another embodiment, the microfluidic dye laser light wavelength shift is in a range of about 0 to 70 nm in response to a mechanical deformation of the elastomer in a transverse direction of the single mode 3D waveguide.

In yet another embodiment, the pump light source comprises a Nd:YAG laser.

In yet another embodiment, the pump light source comprises a solid state laser.

In yet another embodiment, the solid state laser comprises a semiconductor laser having a wavelength of about 405 nm.

In yet another embodiment, the solid state laser comprises a high power near infrared semiconductor laser having a wavelength in the range of 700 nm to 1000 nm.

In yet another embodiment, the pump light source comprises a light emitting diode.

In yet another embodiment, the microfluidic dye laser is configured to operate with a pump light source having a pump threshold energy of less than 1 μJ.

In yet another embodiment, the microfluidic dye laser further comprises a lens configured to optically couple the pump light into the single mode 3D waveguide.

In yet another embodiment, the microfluidic dye laser further comprises a plurality of microfluidic channels, each of the plurality of microfluidic channels configured as one of a plurality of single mode 3D waveguides. Each of the plurality of microfluidic channels are configured to accept a fluidic dye and each of the plurality of microfluidic channels having an optical grating formed therein, wherein the pump light is optically coupled to at least one of the single mode 3D waveguides of the plurality of microfluidic channels. When a fluidic dye is present in at least one of the plurality of single mode 3D waveguides, at least one of the plurality of single mode 3D waveguide is configured to provide a single mode microfluidic dye laser light as output at the microfluidic dye laser light wavelength in response to illumination with light from the pump light source at the pump light wavelength.

In yet another embodiment, a first fluidic dye is present in a first of the plurality of microfluidic channels and a second fluidic dye is present in a second of the plurality of microfluidic channels.

In yet another embodiment, the first fluidic dye and the second fluidic dye are different dyes.

In yet another embodiment, the first fluidic dye and the second fluidic dye are present in different concentrations in a carrier medium.

In yet another embodiment, the first fluidic dye emits light at a first microfluidic dye laser light wavelength and the second fluidic dye emits light at a second microfluidic dye laser light wavelength different from the first microfluidic dye laser light wavelength.

In yet another embodiment, the optical grating is a long period Bragg grating.

In yet another embodiment, the long period Bragg grating is configured to operate below the 50th Bragg order.

In yet another embodiment, the elastomer comprises a silicone elastomer.

In yet another embodiment, the silicone elastomer comprises poly dimethylsiloxane.

In another aspect, the invention features a microfluidic dye laser-based portable instrument system, comprising: a microfluidic dye laser and a portable analysis module; wherein the microfluidic dye laser and the portable analysis module are configured to co-operate to illuminate a specimen of interest for analysis. The portable analysis module is configured to analyze light emitted from, reflected from, or transmitted through the specimen of interest. The portable analysis module is configured to provide information about the specimen.

In one embodiment, the portable analysis module includes a fluorescence based biotechnology analysis.

In another embodiment, the microfluidic dye laser based portable instrument system further comprises an array of multiwavelength microfluidic dye lasers.

In yet another embodiment, the portable analysis module performs multi-color flow cytometry.

In yet another embodiment, the portable analysis module performs a real time Polymerase Chain Reaction analysis.

In another aspect, the invention features a method of tuning a wavelength of a microfluidic dye laser light, comprising the steps of: providing a microfluidic dye laser comprising an elastomeric material, the elastomeric material being transparent at a selected wavelength of dye laser light and having an optical cavity defined within the elastomeric material; providing a force actuator configured to apply a mechanical force to the elastomeric material; providing a flow of dye through a microfluidic channel formed in the elastomeric material, the dye configured to provide light at the selected dye laser wavelength; providing pump illumination at a pump wavelength at which the elastomeric material is transparent, and at which wavelength the dye absorbs illumination; and applying the mechanical force to the elastomeric material to change a periodicity of an optical grating formed in a single mode 3D waveguide in the microfluidic channel, the mechanical force causing a shift of a resonant wavelength of at least one Bragg order of the optical grating to tune the wavelength of the microfluidic dye laser light.

In one embodiment, the force actuator comprises a micrometer-based mechanical device.

BRIEF DESCRIPTION OF THE DRAWINGS

The objects and features of the invention can be better understood with reference to the drawings described below, and the claims. The drawings are not necessarily to scale, emphasis instead generally being placed upon illustrating the principles of the invention. In the drawings, like numerals are used to indicate like parts throughout the various views.

DETAILED DESCRIPTION OF THE INVENTION

This detailed description is divided into to two parts. Part I describes a microfluidic dye laser using a 3D optical waveguide and a Bragg grating (distributed feedback) that can provide both transverse mode and longitudinal mode selection. Part II describes a microfluidic dye laser that includes a mechanical tuning method and apparatus to vary the wavelength of a microfluidic laser. The inventive optofluidic dye laser typically incorporates relatively small physical structures and has been illustrated and described herein as exemplary embodiments of "microfluidic" dye lasers. The examples, however, are not intended to be restrictive with respect to the size of physical structures, except where for example, physical sizes determine waveguide modes. The terms optofluidic and microfluidic are used interchangeably throughout. It further understood that some of the disclosed structures and principles are not necessarily restricted to microfluidic structures.

Part I: A Microfluidic Dye Laser Including a 3D Optical Waveguide:

A single mode optofluidic dye laser uses a phase shifted 15th order distributed feedback ("DFB") structure embedded in a single transverse mode channel waveguide. DFB cavities combined with 3D optical waveguides are very efficient structures for making single frequency microfabricated lasers. Fabrication of single frequency microfabricated lasers on a microfluidic chip can greatly improve the performance of microfabricated liquid dye lasers.

Figure 1:
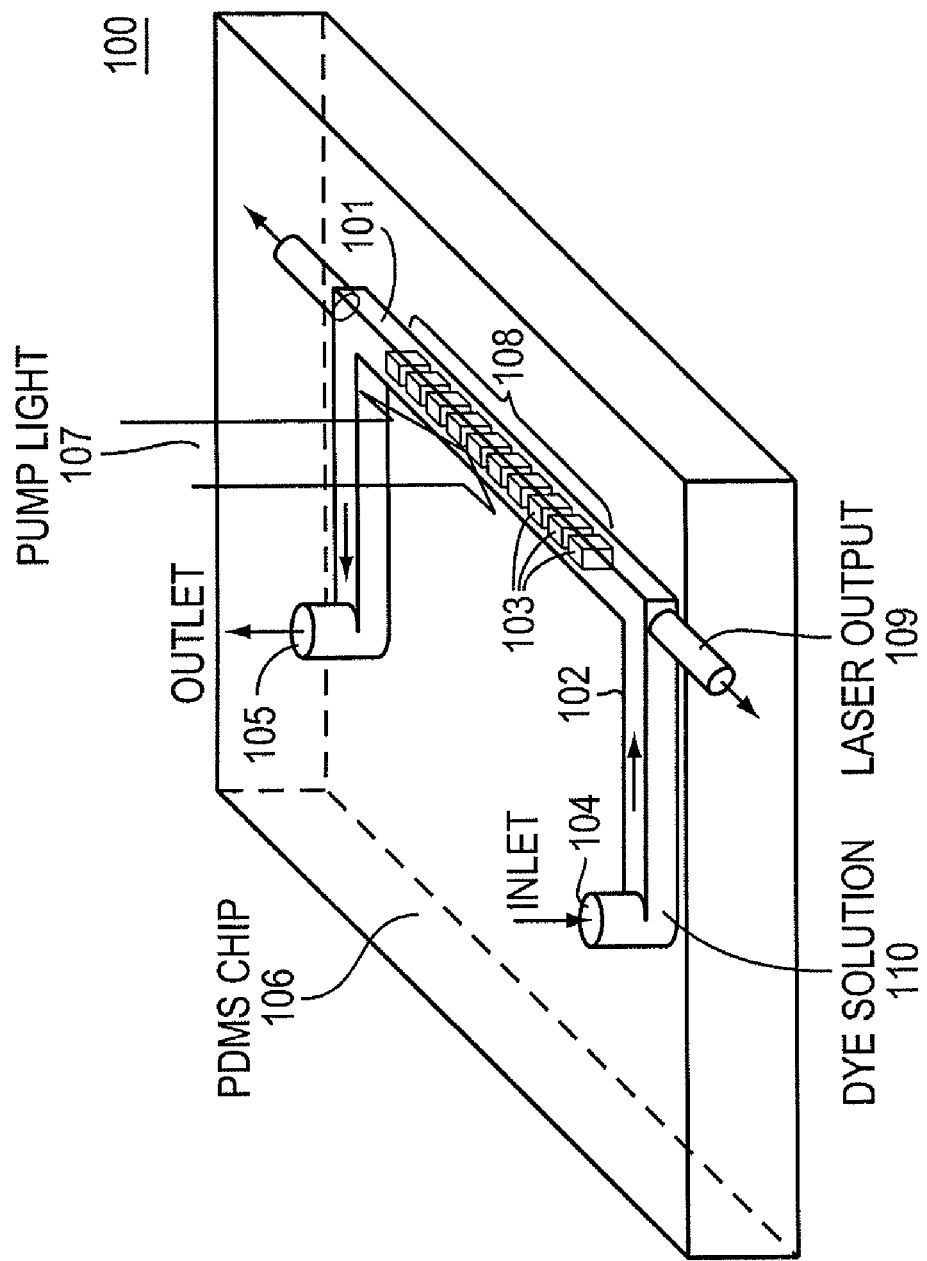
FIG. 1 illustrates an exemplary embodiment of a monolithic optofluidic DFB dye laser chip according to the invention.

FIG. 1 shows one embodiment of a monolithic optofluidic DFB dye laser chip 100 according to the invention. Microfluidic dye laser 100 can be fabricated in a material 106 such as poly dimethylsiloxane) (PDMS). A microfluidic channel 102 provides a fluid channel for a fluidic dye. The fluidic dye can be introduced into microfluidic dye laser 100 at a fluid inlet 104 and extracted at a fluid outlet 105. An optical waveguide 101 can be formed in a portion of the microfluidic channel 102. An optical Bragg grating 108, such as formed by exemplary PDMS posts 103 can be formed in optical waveguide 101. When the optical waveguide 101 is illuminated by pump light 107 of a suitable wavelength and optical power, microfluidic dye laser 100 generates a microfluidic dye laser light 109 at a microfluidic dye laser wavelength. In the embodiment shown in FIG. 1, microfluidic dye laser light 109 can be emitted from both ends of optical waveguide 101. It is contemplated that a one sided emitter could be made by fabricating a high reflectivity mirror at one end of the optical waveguide 101.

The laser chip 100 can be entirely made of a material such as PDMS, a silicone elastomer which has become popular for microfluidics and nanofabrication, and has good optical properties in the visible region. A sufficiently small microfluidic channel, when filled with a dye solution of higher refractive index than that of PDMS (nPDMS=1.406), acts as a single mode optical waveguide 101. An exemplary gain medium suitable for use in the embodiment of the dye laser chip shown in FIG. 1, is a 1 mM solution of Rhodamine 6G (synonyms: 2-[6-(ethylamino)-3-(ethylimino)-2,7-dimethyl-3H-xanthen-9-yl]-benzoic acid, ethyl ester, chloride or tetrafluoroborate or perchlorate; Rhodamine 590, such as available from the Exciton Co. of Dayton, Ohio) in a methanol and ethylene glycol mixture having a refractive index of 1.409. The periodic PDMS posts 103 inside the channel can form an exemplary 8 mm long $15^{th}$ order Bragg grating which provides the optical feedback necessary for the laser action. In addition, a $15\pi/2$ phase shift can be introduced at the center of the grating to ensure single frequency operation. PDMS posts 103 can also provide support for the microfluidic channel.

The exemplary optofluidic DFB dye laser of FIG. 1 was fabricated using the same replica molding soft lithography technique which is widely used to make microfluidic devices.

EXAMPLE 1

Figure 2C:
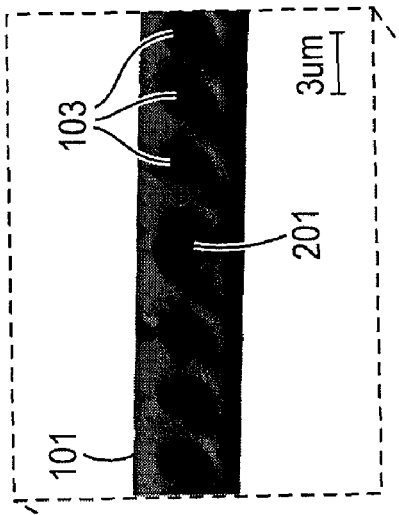
FIG. 2C shows a further magnified view of the exemplary microfluidic channel of FIG. 2B highlighting an exemplary larger central PDMS post.
Figure 2B:
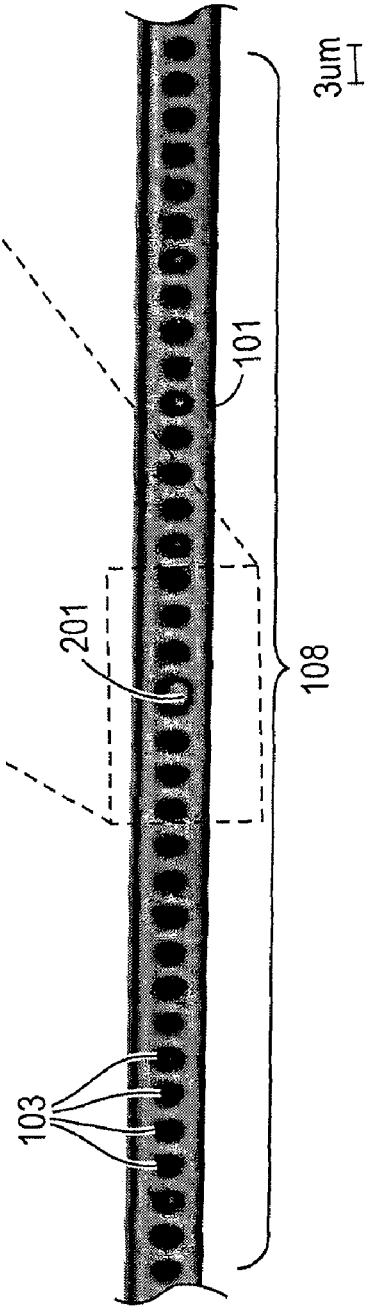
FIG. 2B shows an optical micrograph of an exemplary microfluidic channel.
Figure 2A:
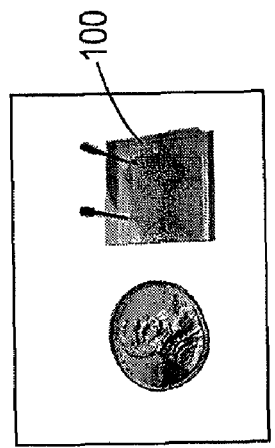
FIG. 2A shows a photograph of an exemplary dye laser compared to the size of a U.S. one cent coin.

Briefly, a master mold was fabricated using conventional photolithography. 2 um thick SU8-2002 negative photoresist (available from the MicroChem. Corp. of Newton, Mass.) was spin-coated on a silicon wafer and patterned with a Cr-on-glass mask. The mold was treated with trimethylchlorosilane (available from the Sigma-Aldrich Co. of St. Louis, Mo.) for 3 min before use to facilitate the release of PDMS. Then 5:1 part A:B PDMS prepolymer (GE RTV 615, General Electric ("GE") Sealants RTV Products-Elastomers) was poured onto the mold and baked at 80° C. for 30 min. The partially cured PDMS was peeled from the master and the liquid inlet and outlet ports were punched through the whole layer using a 23-gauge luer-stub adapter. The patterned PDMS, containing the laser structure, was then treated with oxygen plasma and bonded to another featureless PDMS to form a monolithic device. Finally, the resulting device was cut to size and baked overnight at 80° C. FIG. 2A shows an illustration of an exemplary optofluidic dye laser chip 100 fabricated according to the method of example 1. FIG. 2B shows an optical micrograph of the exemplary microfluidic channel with an embedded phase shifted $15^{th}$ order DFB structure 101 on a PDMS chip 100. The grating period is 3 μm. The exemplary channel width is 5 μm. The central exemplary larger PDMS post 201, also shown in the magnified view of FIG. 2C, introduces a $15\pi/2$ phase shift.

Turning now to the subject of longitudinal and transverse mode selection, to make a single mode laser, both the transverse mode and longitudinal mode selection are carefully designed. The following example illustrates the design process.

EXAMPLE 2

A microfluidic dye laser of the type shown in FIG. 1 was fabricated and tested. The optical waveguide dimensions (width 5 μm; height 2 μm) were chosen such that when filled with liquid of refractive index 1.409, the waveguide supported only the two fundamental $E_{11}$ modes. If we define the x direction along the width and the y direction along the height, the $E_{11}^x$ mode (transverse E field along x direction, considered to be TE-like) is more confined than the $E_{11}^y$ mode, and thus is the preferred lasing mode. The small cross-section area not only reduces the required pump power to achieve the lasing threshold but also resulted in an extremely small consumption of dye solution (less than 40 picoliter per channel per fill).

To obtain stable single frequency operation, the free spectral range ("FSR") of the employed cavity structure has to be larger than the gain spectral bandwidth. Organic dye molecules are well known to have very broad gain spectra with a typical bandwidth of 30 nm to 50 nm full width at half maximum ("FWHM"). In this example, the very broad gain spectra forced the characteristic length of the resonant structure to be shorter than 4 μm. When a DFB structure was used to provide the optical feedback, the lasing wavelength was determined by the Bragg condition to be:

$$m\lambda_m = 2n_{eff}\Lambda \qquad \text{equation 1}$$

where $\lambda_m$ is the mth order resonant wavelength, $n_{eff}$ is the effective index of the guided mode and $\Lambda$ is the grating period. Equation 2 calculates the FSR and equation 3 shows the spacing of the FSR period in frequency by substituting equation 1 into equation 2.

$$FSR = \frac{\lambda_m}{m-1} \qquad \text{equation 2}$$

$$\Delta\nu = \frac{c}{2n_g\Lambda} \qquad \text{equation 3}$$

Therefore for a DFB structure with $\Lambda = 3$ μm (1.5 μm+1.5 μm) and the group index $n_g \approx 1.407$, the $15^{th}$ resonant wavelength and FSR are 563 nm and 40.2 nm respectively. In addition the even order resonances were absent when a 50% duty-cycle square-wave shaped grating was used. The resulting effective FSR of ~90 nm ensured a single resonance inside the gain spectrum of Rhodamine 6G which spans from 550 nm to 650 nm. However, within each resonance, there were still side modes due to the finite length of the grating. It is well known that a DFB laser with a uniform grating operates not at the Bragg wavelength, but instead at the two degenerate wavelengths situated symmetrically on either side of the Bragg wavelength. To break this degeneracy, a $7\pi+\pi/2$ phase shift was introduced at the center of the grating. Any effective $\pi/2$ phase shift ($n\pi+\pi/2$; $n \leq 7$, positive integer) can open up a defect mode inside the stop band of the DFB spectrum, which will force the laser to operate at this defect frequency to ensure single frequency output. The $7\pi+\pi/2$ phase shift was chosen to be compatible with the resolution of the photolithographic fabrication method.

Figure 3:
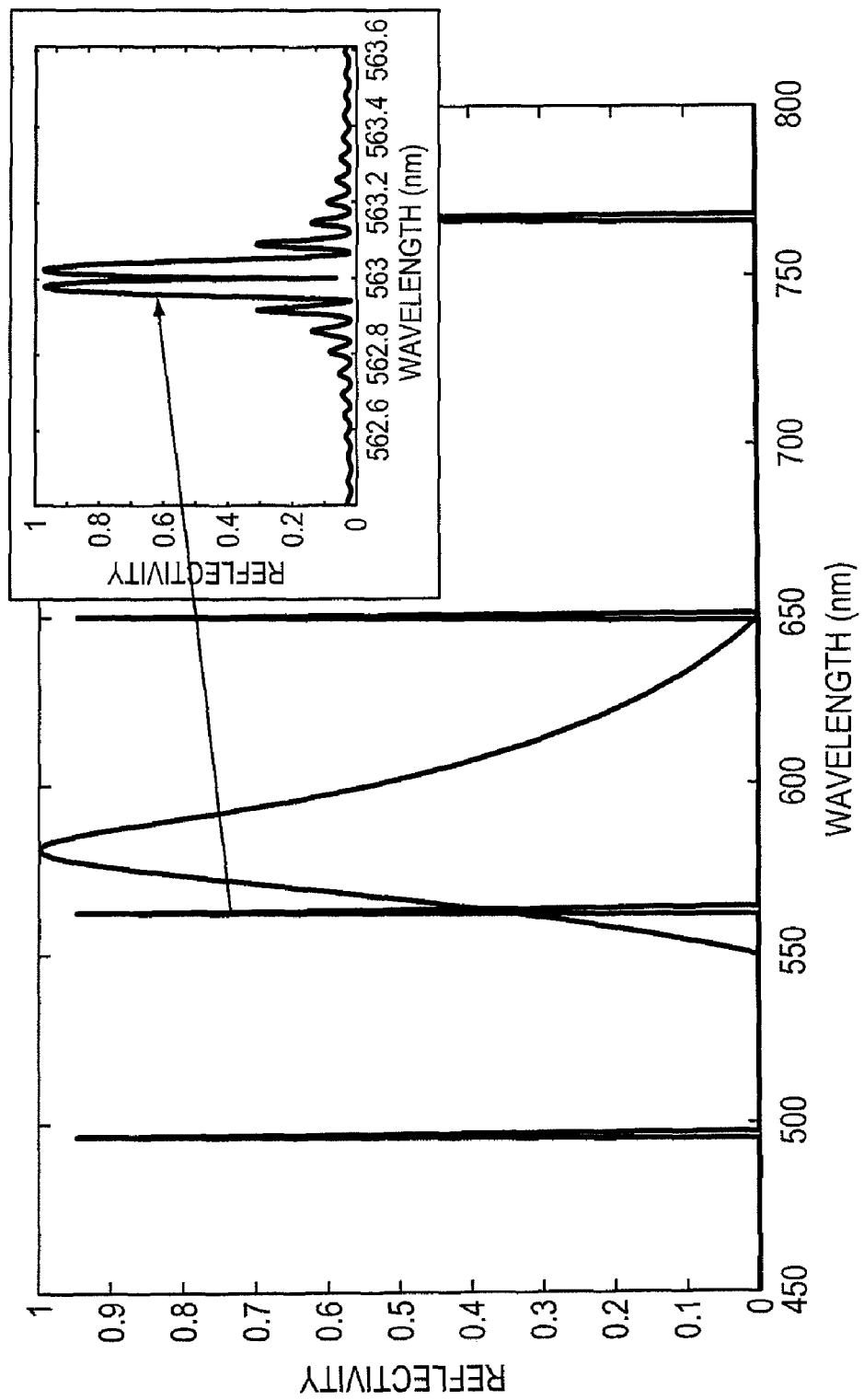
FIG. 3 shows a graph of a simulated reflectivity spectrum of a 15π/2 phase shifted DFB structure.

FIG. 3 shows a simulated reflectivity spectrum of the overall structure of example 2, a $15\pi/2$ phase shifted 15th order DFB structure, using Rouard's method. The parameters used were: $\Lambda = 1.5$ μm+1.51 λm, grating length L=4 mm, $15\pi/2$ phase shift at the center, core index $n_{core} = 1.409$, and cladding/post index $n_{clad} = 1.406$. It can be seen that only the 15th resonance falls within the gain spectrum of Rhodamine 6G. The inset of FIG. 3 shows an enlarged plot of the detailed 15th resonance, where the high-pass dip inside the stop band corresponds to the lasing mode.

An interesting property of the higher order DFB structure is that it enables multicolor lasing in the same cavity each at a single frequency. For example, FIG. 3 shows that the DFB structure employed in this work can support 497 nm, 563 nm and 650 nm lasing as long as a suitable dye is chosen for each wavelength. Multicolor lasing is a highly desired feature for applications where multi-wavelength laser sources are needed such as multi-color flow cytometry and multiplex real time polymerase chain reaction (PCR). However, compared with the first order DFB structure, higher order DFB cavities are less efficient in terms of light confinement because the coupling coefficient is inversely proportional to the order of the Bragg scattering. Lower efficiency can be compensated by increasing the cavity length to provide strong enough feedback.

EXAMPLE 3

Figure 4:
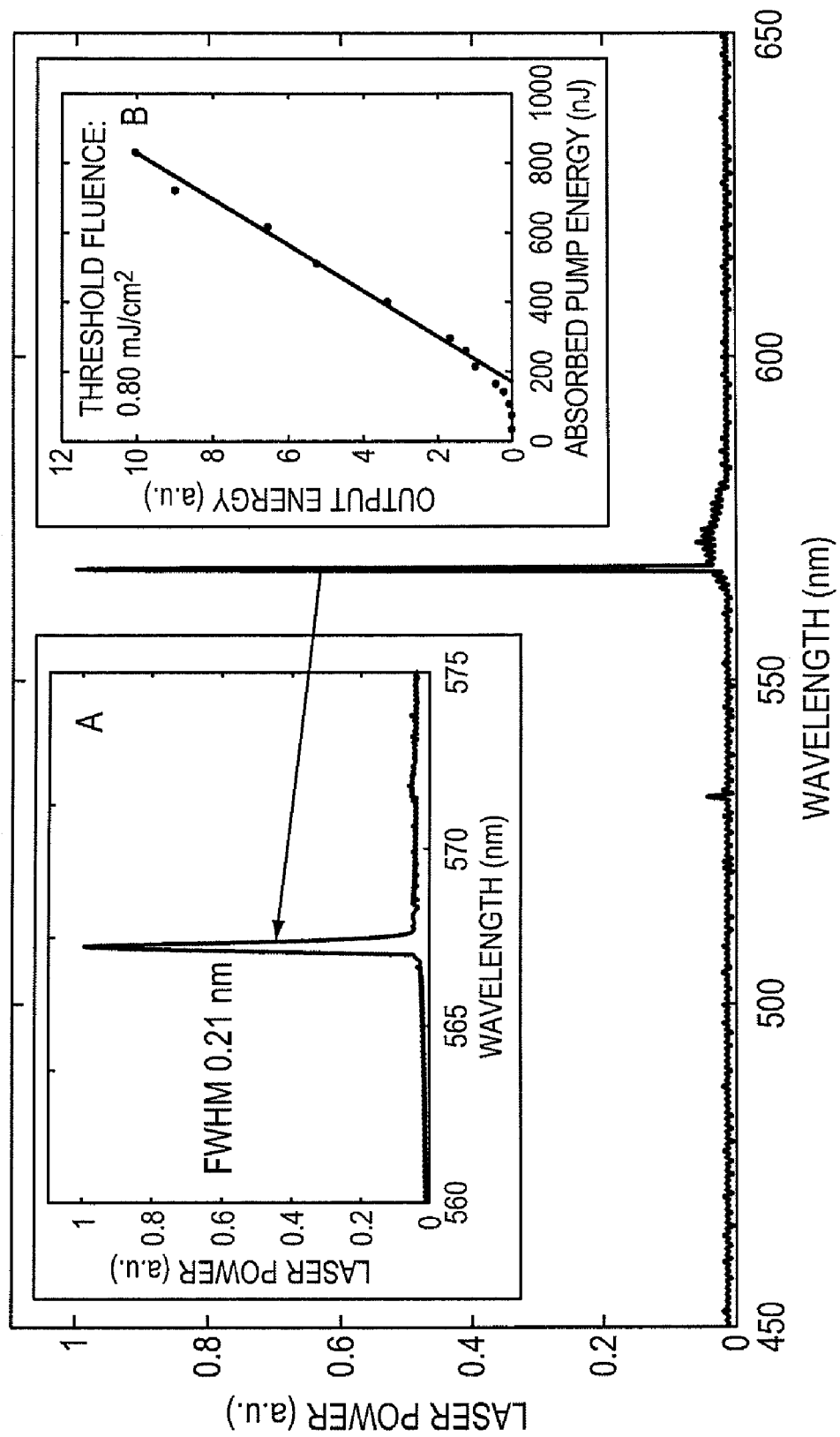
FIG. 4 shows a graph of an exemplary optofluidic DFB dye laser spectrum, an inset graph A showing an expanded view of the peak wavelength, and an inset graph B showing the output energy vs. an exemplary absorbed pump energy curve.

A dye solution was introduced into the microfluidic channel of the microfluidic laser of example 2, by applying 10 psi pressure at an inlet port. It was found that to operate the laser in the pulsed mode that it was not necessary to circulate the dye solution, although continuous circulation of the dye solution did increase the output power. The laser chip was optically pumped with 6 ns Q-switched Nd:YAG laser pulses of 532 nm wavelength, focused to a ~100 μm wide stripe aligned with the microfluidic channel. A 10× microscope objective was used to collect the emission light from one edge of the chip and deliver the emission light to a fiber coupled CCD-array based spectrometer, Ocean Optics model no. HR4000 having a 0.1 nm resolution (manufactured by Ocean Optics, Inc. of Dunedin, Fla.). A typical single mode lasing spectrum is shown in FIG. 4 where the lasing wavelength is 567.3 nm, very close to the predicted value 563 nm. The measured linewidth (inset "A") is 0.21 nm. A plot of laser output energy versus the absorbed pump energy is shown in inset "B" of FIG. 4. The threshold pump fluence was estimated to be ~0.8 mJ/cm², which gave a peak pump intensity of around 150 kW/cm². The laser remained single mode at pump levels as high as 8 mJ/cm². At moderate pump intensities (~200 kW/cm²) and 10 Hz repetition rate, stable laser output lasted longer than 20 minutes and the chip could be reused many times after proper cleaning with ethanol.

We considered two wavelength tuning mechanisms, the elasticity of silicone elastomer and the microfluidics compatibility of the laser chip. First, the grating period can be tuned by stretching or compressing the whole chip due to the low Young's modulus of PDMS (~750 kPa) as described in Part II below. Second, the refractive index of the dye solution can be tuned by mixing two solvents with different refractive indices. For example, using methanol and dimethylsulfoxide (DMSO), the achievable refractive index change can be as large as 0.148 (1.33 for methanol versus 1.478 for DMSO). Furthermore, different dye molecules can be used to cover an even larger spectral range. The mixing, switching and delivery of dye solutions can all be implemented on a silicone elastomer microfluidic chip using the recently developed mechanical micro valves and pumps as shown by Unger et al. in "*Monolithic Microfabricated Valves and Pumps by Multilayer Soft Lithography*", Science Vol. 288. no. 5463, pp. 113-1167, April 2000.

In summary of Part I, we have demonstrated a phase shifted 15th order DFB structure as the optical cavity in an optofluidic dye laser system. Single mode operation was obtained with pump fluence from 0.8 mJ/cm² to 8 mJ/cm². The measured laser linewidth was 0.21 nm. The fabrication and operation of the laser chip is fully compatible with silicone elastomer based microfluidics technology. As described in Part I, an optofluidic distributed feedback (DFB) dye laser having a 3D single mode microfluidic channel waveguide has been demonstrated on a monolithic poly(dimethylsiloxane)

(PDMS) elastomer chip. Stable single-mode operation with narrow linewidth was obtained using a phase-shifted higher order Bragg grating embedded in the single mode microfluidic channel waveguide. The use of PDMS and soft lithography results in inexpensive and easy fabrication, rapid device prototyping, biocompatibility and the opportunity to create disposable devices.

Part II: A Mechanical Tuning Method and Apparatus for Varying the Wavelength of a Microfluidic Dye Laser:

We now describe a tunable single-mode DFB dye laser that combines the mechanical flexibility of elastomer materials to accomplish mechanical tuning with the reconfigurability of the liquid dye gain medium.

Figure 5:
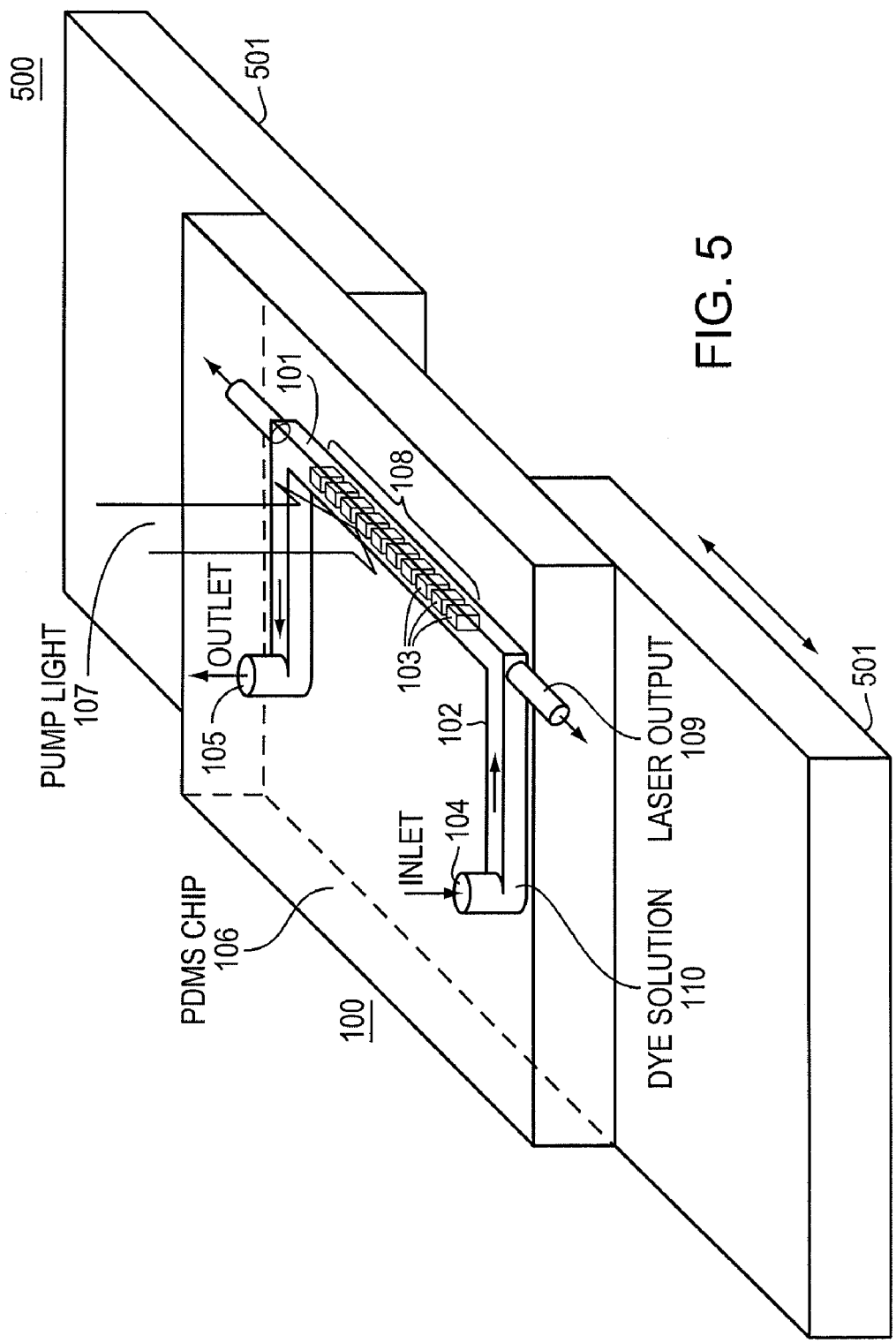
FIG. 5 shows an exemplary mechanically tunable optofluidic DFB dye laser chip according to the invention.

FIG. 5 shows one embodiment of a mechanically tunable optofluidic DFB dye laser chip 500. The microfluidic dye laser 100 can be similar to the microfluidic dye laser 100 described above. The monolithic PDMS laser chip 100 can be of the embodiment as shown in FIG. 2A and the central phase-shifted region of the laser cavity can be embodiments as shown in FIG. 2B and FIG. 2C. Microfluidic dye laser 100 can be fabricated in a material 106 such as PDMS. A microfluidic channel 102 provides a fluid channel for a fluidic dye. The fluidic dye can be introduced into microfluidic dye laser 100 at a fluid inlet 104 and extracted at a fluid outlet 105. An optical waveguide 101 can be formed in a portion of the microfluidic channel 102. A grating 108, such as formed by exemplary PDMS posts 103 can be formed in optical waveguide 101. When the optical waveguide 101 is illuminated by pump light 107 of a suitable wavelength and optical power, microfluidic dye laser 100 generates a microfluidic dye laser light 109 at a microfluidic dye laser wavelength. In the embodiment shown in FIG. 5, microfluidic dye laser light 109 can be emitted from both ends of optical waveguide 101. It is also contemplated that a one sided emitter could be made by fabricating a high reflectivity mirror at one end of the optical waveguide 101.

The microfluidic dye laser wavelength can be set by a combination of factors including, dye type, dye concentration, and mechanical deformation of material 106 in the longitudinal direction of the optical waveguide 101 that causes the distance between PDMS posts 103 to vary. A change in the resonant wavelength of the grating 108, caused by such a longitudinal mechanical deformation, causes a shift in the wavelength of the microfluidic dye laser light 109. For a particular dye type and dye concentration, the microfluidic dye laser wavelength can be tuned by varying the longitudinal deformation of a grating in optical waveguide 101 (e.g. as formed by PDMS posts 103). In some cases, the transverse loading geometry may be more preferred, in which the deformation force is applied transverse to the channel. Since PDMS is almost a perfectly incompressible material with Poisson's ratio ~0.5, the transverse strain can be efficiently translated to longitudinal strain.

EXAMPLE 4

A microfluidic dye laser of the type shown in FIG. 5 was fabricated and tested. A Bragg grating with a 3080 nm period was embedded in a 3 µm wide microfluidic channel. The channel height was 2 µm. The size of the PDMS posts was about 1.28 µm×1.8 µm as inferred from the optical micrograph. A central larger PDMS post introduced an effective $\pi/2$ phase shift to ensure single wavelength lasing. The movement of the translation stage was used to deform the chip which caused the grating period to change. The exemplary optofluidic DFB dye laser was fabricated, as shown in FIG. 1, on a monolithic PDMS chip by replica molding, an inexpensive soft lithography technique as was described in Part I. When the microfluidic channel was subsequently filled with liquid of higher refractive index than that of PDMS (1.406, GE RTV615), a buried channel waveguide was formed. The channel dimensions were 2 µm×3 µm and the index contrast was less than 0.003 so that the waveguide supported only the fundamental $TE_{00}$ and $TM_{00}$ modes. Distributed optical feedback was provided by defining periodic PDMS posts inside the channel with a 3080 nm period. The periodic PDMS posts formed a 1 cm long 15th-order Bragg grating at wavelength approximately 570 nm. The PDMS posts also provided mechanical support, preventing the microfluidic channel from collapsing. An effective $\pi/2$ phase shift was introduced at the center of the grating to ensure single frequency operation at the Bragg wavelength. The gain medium, a 2 mM solution of Rhodamine 6G (Rh6G) (Synonyms defined in Part I) or Rhodamine 101 (Rh101) (Synonyms: 9-(2-carboxyphenyl)-2,3,6,7,12,13,16,17-octahydro-1H,5H,11H,15H,-xantheno[2,3,4-ij:5,6,7-i'j']-diquinolizin-4-ium perchlorate; Rhodamine 640 Perchlorate, such as available from the Exciton Co. of Dayton, Ohio) in a methanol and ethylene glycol mixture with refractive index of 1.409, was then introduced into the flow channel to form the waveguide. To pump the dye molecules, 6 ns Q-switched Nd:YAG laser pulses with 532 nm wavelength were focused through a cylindrical lens onto a ~100 µm×1 cm stripe aligned with the microfluidic channel.

Figure 6:
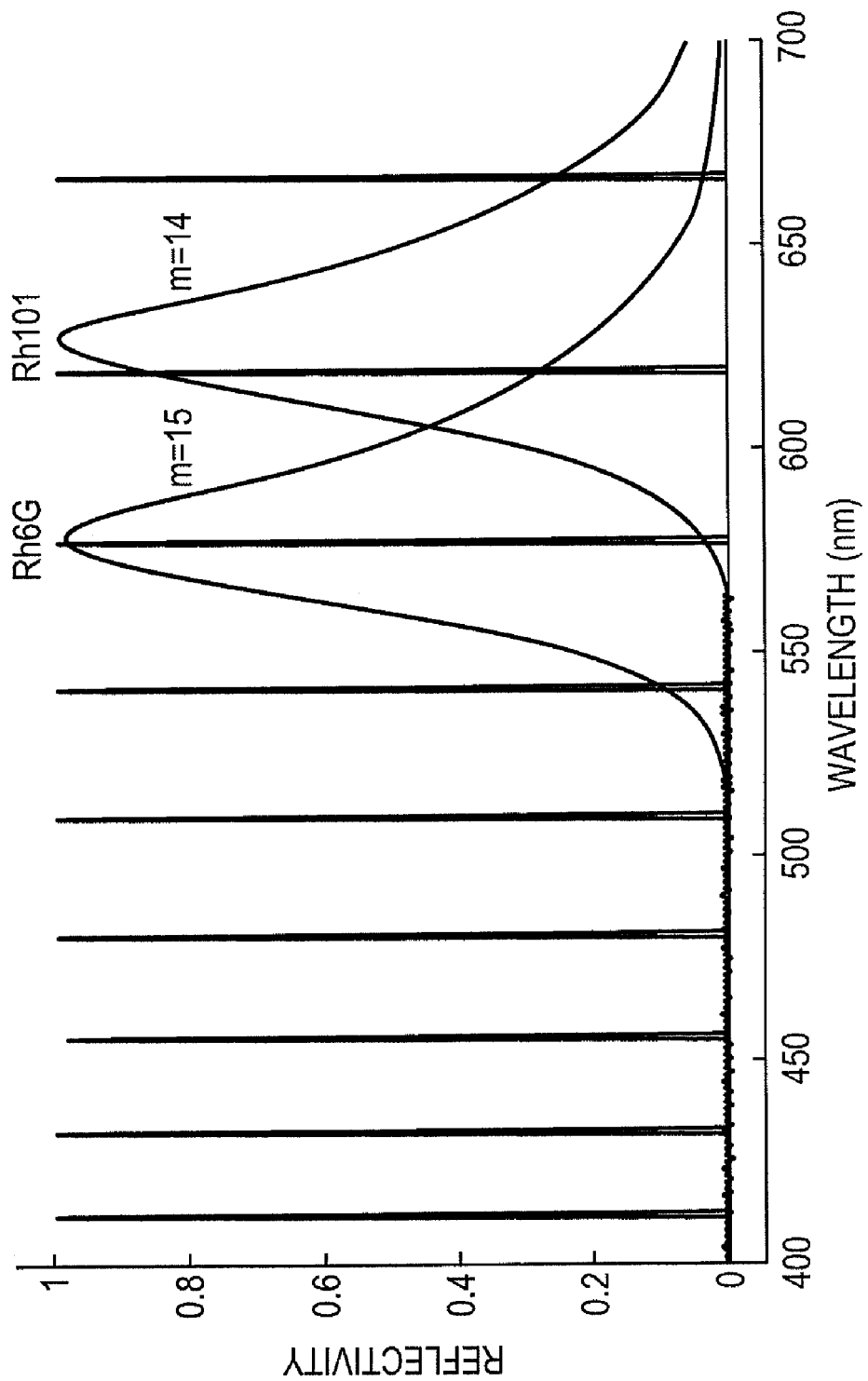
FIG. 6 shows a graph of an exemplary simulated reflectivity spectrum of a $\pi/2$ phase shifted higher order DFB structure.

The fabrication, dye chemistry, and operation of a laser chip, such as the laser chip described in example 4 above, are fully compatible with silicone elastomer based microfluidics technology. When a $\pi/2$ phase-shifted DFB structure is used to provide the optical feedback, the lasing wavelength can be determined by the Bragg condition as was previously described by equation 1. Given $\Lambda=3080$ nm and $n_{eff}=1.407$ in one exemplary embodiment, the 15th resonant wavelength and the FSR are 577.8 nm and 41.3 nm respectively. This large FSR ensures that at most two resonances can be simultaneously supported within the gain spectrum (typically 30-50 nm wide for dye molecules). Thus single frequency operation is obtained even at high pump levels due to gain discrimination. FIG. 6 shows a simulated reflectivity spectrum of an overall exemplary structure using the Rouard's method. The parameters used are: $\Lambda=1280$ nm+1800 nm, grating length L=1 cm, effective $\pi/2$ phase shift at the center, core index $n_{core}=1.409$ and cladding/post index $n_{clad}=1.406$. FIG. 6 also shows the normalized measured fluorescence spectra of Rh6G and Rh101 solutions used in the lasing experiment of example 4.

The lasing wavelength of a microfluidic dye laser of the type shown in FIG. 1 and FIG. 5 can be tuned by changing either $n_{eff}$, $\Lambda$, or m, as has been demonstrated in conventional DFB dye lasers. The effective index $n_{eff}$ can be varied by changing the core index or the cross sectional dimensions of the waveguide. However, the low Young's modulus of PDMS (~750 kPa) as shown in FIG. 5, enables a much more straight forward tuning method consisting of changing the grating period by simply stretching or compressing the elastomeric chip along the waveguide direction. Moreover, the grating order m can be chosen by using different dye molecules whose emission spectra cover different spectral regions. The last two methods were used to achieve a nearly 60 nm tuning range from yellow to red. As can be observed from FIG. 6, the potential tuning range for Rh6G and Rh101 is larger than 100 nm covering the spectrum from 550 nm to beyond 650 nm. Actually, because of the multiple spectral resonances supported by the higher order grating, this laser cavity design can provide tunable output covering the entire available dye laser spectrum from 320 nm to 1200 nm when suitable dye molecules and pump light are selected. With a mixture of several dye molecules, simultaneous multiple color lasing from the same cavity is also possible.

EXAMPLE 5

Figure 7:
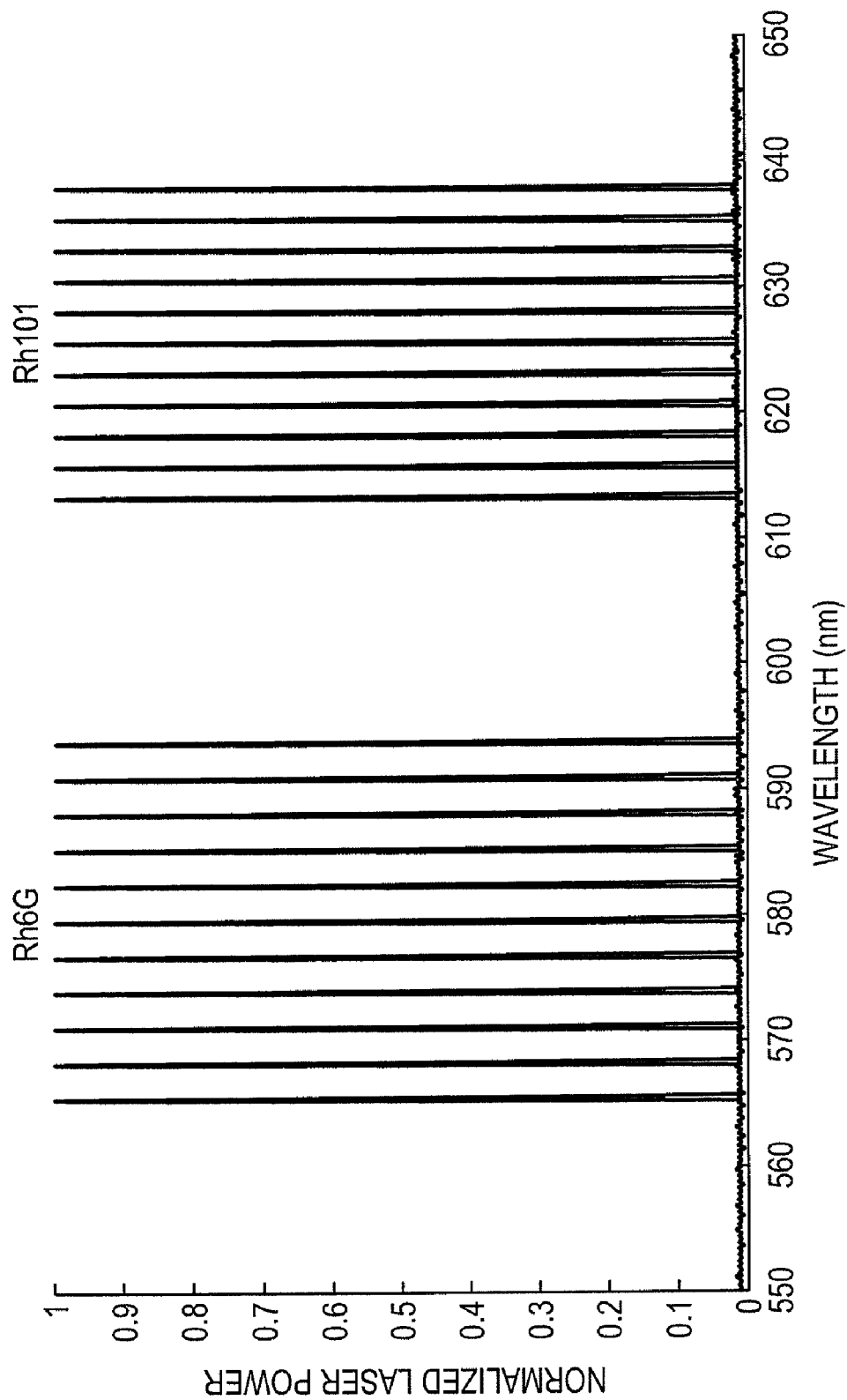
FIG. 7 shows a graph of an exemplary normalized laser output of the mechanically tunable optofluidic DFB dye laser chip of FIG. 5.
Figure 8:
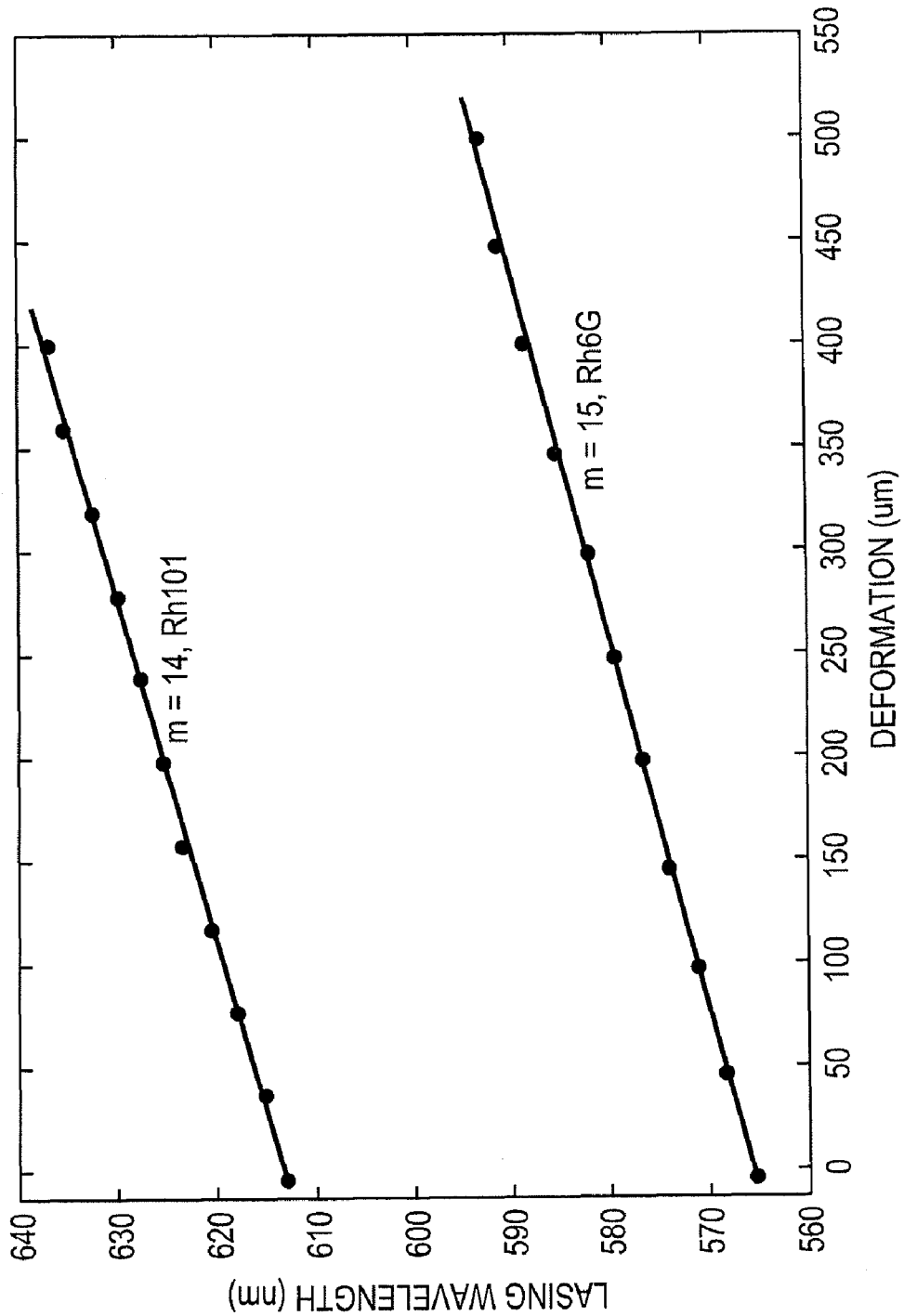
FIG. 8 shows a graph of an exemplary lasing wavelength vs. measured chip deformation.

To achieve mechanical tuning, the laser chip was glued to two micrometer stages with the laser region suspended in the center as shown in the embodiment of FIG. 5. One of the stages was a high resolution micrometer with 1 µm sensitivity which provided accurate control and quantitative measurement of the deformation of the elastomer chip. The mechanical stages allowed us to both stretch and compress the chip along the channel direction, and the result of mechanical cavity tuning is summarized in FIG. 7 and FIG. 8. FIG. 7 shows a normalized laser output of the mechanically tunable optofluidic DFB dye laser. Different peaks correspond to different grating periods. The measured laser linewidth is less than 0.1 nm throughout the tuning range. FIG. 8 shows lasing wavelength versus the measured chip deformation. The points on FIG. 8 represent experimental data whereas the curves follow the linear fit. From the plot of FIG. 8, it can be seen that the single mode tuning range for Rh6G covered a range from 565 nm to 594 nm whereas for Rh101, the tuning range extended from 613 nm to 638 nm. A linear relationship between the lasing wavelength and the chip deformation was also observed in FIG. 8, indicating completely reversible elastic extension of the cavity. When the length of the central suspended region is 1 cm, the total chip deformation required to traverse the above tuning ranges were about 500 µm for Rh6G and 400 µm for Rh101. These macroscopic deformations correspond to 28 nm and 25 nm distortions of the grating period, respectively. Because of the extremely large available elastic deformation of PDMS of over 120%, the ultimate tuning range was limited by the gain bandwidth of the laser dyes chosen. Only ~5% deformation was used to achieve the ~60 nm tuning range demonstrated in this experiment, and we believe that an even wider tuning range from 550 nm to 650 nm is obtainable with improved cavity design and a more uniform mechanical loading. The tuning was continuous and completely reversible, and no noticeable degradation of the chip was observed during a 100-cycle full range tuning test. Throughout the tuning range, stable single-mode operation was maintained with measured linewidth below 0.1 nm, the resolution limited by our spectrometer (Ocean Optics HR4000). The absorbed pump thresholds of this tunable dye laser are ~150 nJ and ~200 nJ for Rh6G and Rh101 respectively. As expected, we observe a decrease in the laser output power as the lasing wavelength was moved away from the peak in the gain spectrum in either direction. The deformation along the channel also caused the transverse waveguide dimensions to change slightly, resulting in changes the effective index of the guided mode. However, given that the Poisson's ratio of PDMS is approximately 0.5, the estimated effective index change was only about $1.5 \times 10^{-5}$ and the effect of lateral waveguide distortion on the lasing wavelength was negligible. In general, any convenient force actuator that can apply a compressive or an expansive force to the elastomeric material at a controlled rate may be used to provide the mechanical tuning effect.

Figure 9:
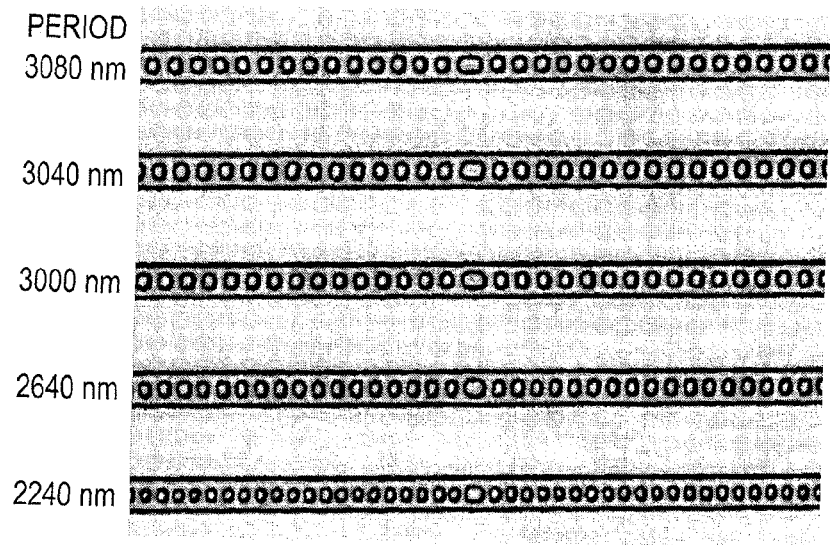
FIG. 9 shows an exemplary micrograph of an integrated array of five optofluidic dye lasers.
Figure 10:
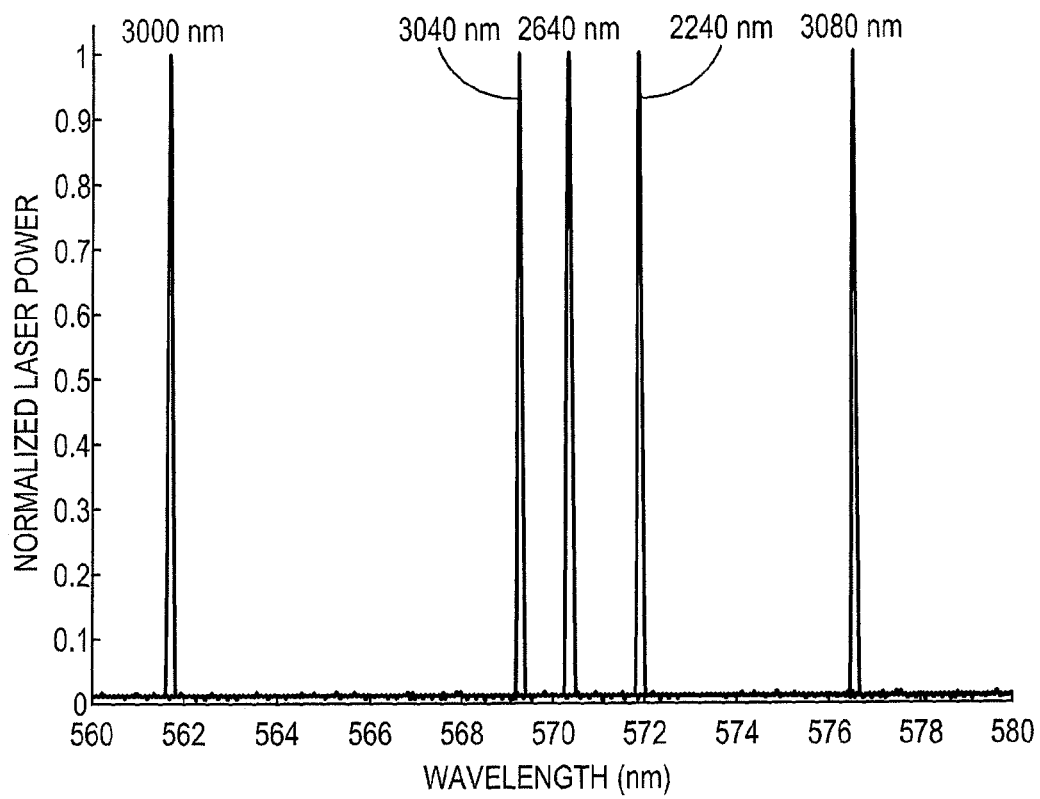
FIG. 10 shows a graph of an exemplary normalized laser output of the array using Rh6G dye solution as the gain medium.

We also fabricated an array of five exemplary DFB dye lasers on a single PDMS chip as shown in FIG. 9. FIG. 10 shows the measured lasing results from the DFB array of FIG. 9, after filling the lasers with the Rh6G dye solution. Lasers with output wavelengths spanning a ~15 nm range were measured from the DFB stripes with different grating periods. The lasers can also use different types of dyes and dyes of different concentrations in their respective carrier mediums. The low pump threshold (<1 uJ) of each optofluidic DFB dye laser makes it possible to use a single high energy pulsed laser to pump hundreds of such lasers on a chip. This opens up the possibility of building highly parallel multiplexed biosensors on a chip ranging from applications as multiple-color flow cytometers and surface plasmon resonance based sensors to Raman spectroscopy sources and compact excitation spectroscopy systems. Portable instruments can include microfluidic dye lasers working in conjunction with one or more portable analysis modules configured to illuminate a specimen of interest for analysis. The portable analysis module can provide information about the specimen by analyzing light emitted from, reflected from, or transmitted through the specimen of interest.

The introduction of replica molded multi-spectral sources in PDMS fluidic systems also provides an alternative to tunable lasers for constructing compact and inexpensive multi-wavelength scanning-less spectrometers integrated in microfluidic devices. The low pump threshold enables the use of visible semiconductor laser diodes or even light emitting diodes as the pump sources to construct low-cost and compact portable spectrometers.

A continuously tunable optofluidic DFB dye laser on a monolithic PDMS chip that uses simple mechanical deformation for accurate wavelength control has been described. Singlemode operation was maintained throughout a ~60 nm tuning range. Due to the higher order of the DFB grating in our devices, a single laser is capable of generating tunable output covering the spectral region from near ultra-violet to near infrared when a UV pump source is used. An integrated multi-spectral DFB laser array was also demonstrated by replica molding. Such laser arrays can be used to make highly parallel multiplexed biosensors and scanning-less spectrometers on a chip.

It is noted that the exemplary lasers of FIG. 1 and FIG. 5 were still not stand-alone devices because an external gas pressure source was required to actuate the microfluidic valves, and an external pump laser is required to pump the dye. However, the gas pressure source can be eliminated, for example by using electrokinetically driven flow, whereas an external pump light continues to be used in our dye laser designs. For portable and inexpensive devices, visible semiconductor lasers or bright light emitting diodes, such as those having a wavelength of about 405 nm for use in Blu-ray® video disc applications, can also be used as the pump source. Dye lasers as generally described herein can also be pumped by two-photon absorption using one or more high power near infra red (IR) semiconductor lasers having a wavelength from 700 nm to 1000 nm.

Although the theoretical description given herein is thought to be correct, the operation of the devices described and claimed herein does not depend upon the accuracy or validity of the theoretical description. That is, later theoretical developments that may explain the observed results on a basis different from the theory presented herein will not detract from the inventions described herein.

While the present invention has been particularly shown and described with reference to the structure and methods disclosed herein and as illustrated in the drawings, it is not confined to the details set forth and this invention is intended to cover any modifications and changes as may come within the scope and spirit of the following claims.

What is claimed is:

1. A microfluidic dye laser comprising:
 a pump light source configured to provide light having a pump light wavelength;
 an elastomer, said elastomer substantially optically transparent at said pump light wavelength and at a microfluidic dye laser wavelength;
 a microfluidic channel defined in said elastomer, said microfluidic channel configured as a single mode 3D waveguide, said microfluidic channel configured to accept a fluidic dye; and
 an optical grating formed in said single mode 3D waveguide to form a single mode optical cavity,
 wherein, when a fluidic dye having a higher refractive index than said channel and said optical grating is present in said single mode 3D waveguide, said single mode 3D waveguide is configured to provide a single mode microfluidic dye laser light as output at said microfluidic dye laser light wavelength in response to illumination with light from said pump light source at said pump light wavelength.

2. The microfluidic dye laser of claim 1, wherein said elastomer is configured to change a resonant wavelength associated with an order of the optical grating in response to a mechanical deformation of the elastomer in a longitudinal direction of the single mode 3D waveguide.

3. The microfluidic dye laser of claim 2, wherein said mechanical deformation of the elastomer is configured to shift the microfluidic dye laser light wavelength.

4. The microfluidic dye laser of claim 3, wherein said microfluidic dye laser light wavelength shift is in a range of about 0 to 70 nm.

5. The microfluidic dye laser of claim 1, wherein said elastomer is configured to change a resonant wavelength associated with an order of the optical grating in response to a mechanical deformation of the elastomer in a transverse direction of the single mode 3D waveguide.

6. The microfluidic dye laser of claim 5, wherein said mechanical deformation of the elastomer is configured to shift the microfluidic dye laser light wavelength.

7. The microfluidic dye laser of claim 6, wherein said microfluidic dye laser light wavelength shift is in a range of about 0 to 70 nm.

8. The microfluidic dye laser of claim 1 wherein said pump light source comprises a Nd:YAG laser.

9. The microfluidic dye laser of claim 1, wherein said pump light source comprises a solid state laser.

10. The microfluidic dye laser of claim 9, wherein said solid state laser comprises a semiconductor laser having a wavelength of about 405 nm.

11. The microfluidic dye laser of claim 9, wherein said solid state laser comprises a high power near infra red semiconductor laser having a wavelength in the range of 700 nm to 1000 nm.

12. The microfluidic dye laser of claim 1, wherein said pump light source comprises a light emitting diode.

13. The microfluidic dye laser of claim 1, wherein said microfluidic dye laser is configured to operate with a pump light source having a pump threshold energy of less than 1 µJ.

14. The microfluidic dye laser of claim 1, further comprising a lens configured to optically couple said pump light into said single mode 3D waveguide.

15. The microfluidic dye laser of claim 1, further comprising
 a plurality of microfluidic channels, each of said plurality of microfluidic channels configured as one of a plurality of single mode 3D waveguides,
 each of said plurality of microfluidic channels configured to accept a fluidic dye and each of said plurality of microfluidic channels having an optical grating formed therein, wherein said pump light is optically coupled to at least one of said single mode 3D waveguides of said plurality of microfluidic channels, and
 when a fluidic dye is present in at least one of said plurality of single mode 3D waveguides, at least one of said plurality of single mode 3D waveguide is configured to provide a single mode microfluidic dye laser light as output at said microfluidic dye laser light wavelength in response to illumination with light from said pump light source at said pump light wavelength.

16. The microfluidic dye laser of claim 15, wherein a first fluidic dye is present in a first of said plurality of microfluidic channels and a second fluidic dye is present in a second of said plurality of microfluidic channels.

17. The microfluidic dye laser of claim 16, wherein said first fluidic dye and said second fluidic dye are different dyes.

18. The microfluidic dye laser of claim 16, wherein said first fluidic dye and said second fluidic dye are present in different concentrations in a carrier medium.

19. The microfluidic dye laser of claim 16, wherein said first fluidic dye emits light at a first microfluidic dye laser light wavelength and said second fluidic dye emits light at a second microfluidic dye laser light wavelength different from said first microfluidic dye laser light wavelength.

20. The microfluidic dye laser of claim 1, wherein said optical grating is a long period Bragg grating.

21. The microfluidic dye laser of claim 20, wherein said long period Bragg grating is configured to operate below the $50^{th}$ Bragg order.

22. The microfluidic dye laser of claim 1, wherein the elastomer comprises a silicone elastomer.

23. The microfluidic dye laser of claim 1, wherein the silicone elastomer comprises poly dimethylsiloxane.

24. A microfluidic dye laser-based portable instrument system, comprising:
 a microfluidic dye laser according to claim 1; and
 a portable analysis module;
 wherein said microfluidic dye laser and said portable analysis module are configured to co-operate to illuminate a specimen of interest for analysis, and said portable analysis module is configured to analyze light emitted from, reflected from, or transmitted through said specimen of interest, said portable analysis module configured to provide information about said specimen.

25. The microfluidic dye laser based portable instrument system of claim 24, wherein the portable analysis module includes a fluorescence based biotechnology analysis.

26. The microfluidic dye laser based portable instrument system of claim 24, further comprising an array of multiwavelength microfluidic dye lasers.

27. The microfluidic dye laser based portable instrument system of claim 26, wherein the portable analysis module performs multi-color flow cytometry.

28. The microfluidic dye laser based portable instrument system of claim 26, wherein the portable analysis module performs a real time Polymerase Chain Reaction analysis.

29. A method of tuning a wavelength of a microfluidic dye laser light, comprising the steps of:
 providing a microfluidic dye laser comprising an elastomeric material, said elastomeric material being transparent at a selected wavelength of dye laser light and having an optical cavity defined within said elastomeric material;

providing a force actuator configured to apply a mechanical force to said elastomeric material;

providing a flow of dye through a microfluidic channel formed in said elastomeric material, said dye configured to provide light at said selected dye laser wavelength;

providing pump illumination at a pump wavelength at which said elastomeric material is transparent, and at which wavelength said dye absorbs illumination; and applying said mechanical force to said elastomeric material to change a periodicity of an optical grating formed in a single mode 3D waveguide in the microfluidic channel, said fluidic dye having a higher refractive index than said microfluidic channel and said optical grating, said mechanical force causing a shift of a resonant wavelength of at least one Bragg order of the optical grating to tune said wavelength of said microfluidic dye laser light.

30. The method of tuning a wavelength of a microfluidic dye laser light of claim 29, wherein said force actuator comprises a micrometer-based mechanical device.

* * * * *